United States Patent Office 3,377,142
Patented Apr. 9, 1968

3,377,142
PHOSPHAZOPHOSPHORYL DIFLUORIDES AND METHODS OF PREPARATION
Santad Kongpricha, Hamden, Conn., and William C. Preusse, Naperville, Ill., assignors to Olin Mathieson Chemical Corporation, New Haven, Conn., a corporation of Virginia
No Drawing. Filed June 19, 1964, Ser. No. 376,579
4 Claims. (Cl. 23—357)

ABSTRACT OF THE DISCLOSURE

Phosphazophosphoryl difluorides having the formula $$R_3P=N-POF_2$$

where R is fluorine, chlorine, aryl or alkyl are provided by reacting phosphoramidic difluoride with phosphorus (V) chlorides having the formula $R_3PCl_2$ at a temperature of about 60° to about 175° C.

---

This invention relates to the preparation of phosphazophosphoryl difluorides, and more specifically it is concerned with derivatives having the formula:

$$R_3P-N-POF_2 \quad (I)$$

in which R represents a fluorine or chlorine atom, an aryl group (e.g., phenyl, tolyl, trimethylphenyl and the like) or an alkyl group.

A necessary intermediate in the preparation of the aforementioned difluorides (I) is phosphoramidic difluoride ($NH_2POF_2$) which is readily prepared by the reaction of pyrophosphoryl tetrafluoride with ammonia (see Example 1 hereinafter).

It has now been found that phosphoramidic difluoride reacts with various phosphorus (V) chlorides in accordance with the following equation (R being as previously defined) to provide the phosphazophosphoryl difluorides of this invention:

$$NH_2POF_2 + (R)_3PCl_2 \rightarrow R_3P=N-POF_2 + 2 HCl$$

The difluorides (I) are surprisingly stable, and they can be handled in air without danger of decomposition. This stability is attributed to the presence of the relatively strong P—F bonds in the prepared derivatives.

A number of phosphorus (V) chlorides can be utilized in the preparation of the phosphazophosphoryl difluorides disclosed herein. For instance, phosphoramidic difluoride can be reacted with phosporus pentachloride to provide $Cl_3P=N-POF_2$ in accordance with this invention. Similarly dichlorotrifluorophosphorane, prepared by the chlorination of $PF_3$ as disclosed by Kennedy et al. in J. Chem. Soc., 1959, 1228, can be employed as a reactant with phosphoramidic difluoride to provide P-trifluorophosphazo-N-phosphoryl difluoride. Compounds of the type $R_3PCl_2$ wherein R is aryl or alkyl are obtained by direct chlorination of the corresponding phosphine derivatives as, for example, shown by Jensen in Z. anorg. allgem. Chem., 250, 257 (1943), and by Seidel et al. in Z. anorg. allgem. Chem., 288, 201 (1956), and are also useful in the preparation of difluorides included in the general Formula I. However, although R may thus represent an aryl moiety, preferred embodiments of this invention include those phosphazophosphoryl difluorides wherein R represents phenyl or phenyl having lower alkyl substituents. These preferred species are prepared by reacting phosphoramidic difluoride with triphenylphosphorus dichloride, tris(4-methylphenyl)phosphorus dichloride, tris(2,4,5-trimethylphenyl)phosphorus dichloride and the like. Similarly, preferred embodiments include phosphazophosphoryl difluorides (I) wherein R represents an alkyl group having 4–6 carbon atoms.

The preparation of the phosphazophosphoryl difluorides disclosed herein should be carried out at a reaction temperature range of about 60° C. to about 175° C. The reaction does proceed at temperatures below 60° C., but an appreciably slower reaction rate is obtained at this lower temperature level. At temperatures much above 175° C., the phosphoramidic difluoride reactant begins to decompose with evolution of ammonia. A preferred temperature range has been found to be 120°–150° C.

The reactions can be carried out by heating the reactants at the aforementioned temperature range wherein hydrogen chloride is evolved. For example, $PCl_5$ can be suspended in phosphoramidic difluoride and heated to provide $Cl_3P=N-POF_2$, and no diluent or solvent is required in this preparation.

However, it is preferred to utilize an inert diluent in the preparations disclosed herein. As used in the specification and claims herein, the term "inert diluent" is understood to represent an organic material which is not susceptible to chlorination at the aforementioned reaction temperatures. Furthermore, the inert diluent may or may not be a solvent for the reactants or products. A number of such diluents may be conveniently employed in the preparations. Particularly useful diluents are the halogenated aliphatic hydrocarbons having up to five carbon atoms and a boiling point of at least 60° C. at atmospheric pressure. For example, chloroform, carbon tetrachloride, sym-tetrachloroethane, 1,1,2,2-tetrachloro-1,2-difluoroethane and the like are advantageously used. Solvents such as benzene and the like may also be employed in the practice of this invention.

The following examples will serve to illustrate this invention. The first example relates to phosphoramidic difluoride preparation, while the remaining examples are illustrative of phosphazophosphoryl difluoride preparation.

Example 1

Freshly prepared pyrophosphoryltetrafluoride, 107.0 g. (0.57 mole) was added to approximately 400 cc. of anhydrous ether in a three-necked flask equipped with stirrer and inlet tubes for nitrogen and ammonia. The flask had previously been thoroughly dried and was blanketed with dry nitrogen while the reactants were added. The reaction vessel was packed in Dry Ice, and 19.0 g. (1.14 mole) of anhydrous ammonia gas was bubbled below the surface of the ether solution while the solution was stirred vigorously. After the ammonia was added over a two hour period, the reaction mixture was allowed to warm up to room temperature. Ammonium difluorophosphate solid was then filtered from the reaction mixture, and the ether filtrate was placed in a distillation still. After removing the ether, a high boiling fraction of 30.0 g. of a colorless liquid having a boiling point of 69° C./0.18 mm. was obtained. The following analytical data revealed that phosphoramidic difluoride had been obtained. Yield: 52%.

Analysis.—Calcd. for $NH_2POF_2$: N, 13.9; P, 30.7; F, 37.6. Found: N, 14.2; P, 30.1; F, 37.9.

Further identification of the compound was made by infrared and nuclear magnetic resonance analyses.

Example 2

14.0 g. (0.042 mole) of triphenylphosphorus dichloride was suspended in 50 ml. of carbon tetrachloride in a 100 ml. round-bottomed flask equipped with water-cooled condenser and drying tube. 10.0 g. (0.099 mole) of phosphoramidic difluoride was added to the mixture, and the total reaction mixture was heated to boiling under total reflux. Hydrogen chloride was liberated from the mixture throughout the reaction period. After the reaction was complete, the reaction solids were filtered from the carbon tetrachloride diluent. The filtered solids were washed with ether and recrystallized from benzene. A white powdery solid melting at 191°–193° C. was obtained. The following analytical data revealed that P-triphenylphosphazo-N-phosphoryl difluoride had been obtained. Yield: 42%.

Analysis.—Calcd. for $C_{18}H_{15}NP_2OF_2$: C, 59.8; H, 4.16; P, 17.2; N, 3.88; F, 10.5. Found: C, 59.6; H, 4.28; P, 17.2; N, 3.93; F, 10.9.

Example 3

67.4 g. (0.323 mole) of phosphorus pentachloride was suspended in 200 ml. of sym-tetrachloroethane in a 500 ml. round-bottomed flask equipped with water-cooled condenser and drying tube. 33.5 g. (0.332 mole) of phosphoramidic difluoride was added to the mixture, and the temperature of the entire reaction mixture was raised slowly while stirring with a magnetic stirrer to the boiling point of the diluent (160° C.) at the end of 3 hours. Hydrogen chloride was liberated from the reaction mixture throughout the reaction period. After the reaction period, the sym-tetrachloroethane was removed by fractional distillation in vacuo at 52° C./21 mm. Hg. Continued fractional distillation provided a colorless liquid boiling at 42° C./1.1 mm. Hg. This liquid had a freezing point of 13° C., and the following analytical data revealed that it was P-trichlorophosphazo-N-phosphoryl difluoride of high purity. Yield: 47%.

Analysis.—Calcd. for $NP_2OCl_3F_2$: Cl. 45.01; N, 5.93; P, 26.21; F, 16.08. Found: Cl, 44.8; N, 5.79; P, 25.52; F, 16.0.

The phosphazophosphoryl difluorides of this invention are useful corrosion inhibitors in functional fluids. They are particularly effective as corrosion inhibitors in hydraulic fluids, heat transfer fluids, and synthetic lubricants used in systems consisting of materials of construction such as aluminum, iron, copper and the like. Their usefulness in this area is attributed to the P—F bonding of the difluorides.

The difluorides (I) are also useful intermediates in the preparation of valuable linear phosphonitrilic polymers. For example, $Cl_3=N—POF_2$ has been polymerized at 200° C. to provide a rubber-like elastomer which was identified by analysis as a linear phosphonitrilic polymer having the recurring unit:

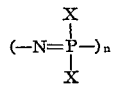

X being Cl or F. Gaseous products were evolved during this polymerization, and mass spectrometric analysis revealed that these volatile products were mainly $POF_2Cl$ although traces of $POFCl_2$, $POCl_3$ and $POF_3$ were also evolved.

The high temperature properties of semi-ceramic materials such as asbestos are enhanced when linear phosphonitrilic polymers of the above type are incorporated in these materials, and as a result superior high temperature gaskets, brake linings and abrasives are provided. The aforementioned linear phosphonitrilic polymers are also useful in coating glass fibers to increase resistance to flexing and abrasion. Similarly, asbestos and other fibrous materials can be coated with these linear polymers to provide electrical insulators with improved heat, flame and moisture resistance.

What is claimed is:
1. A process for preparing phosphazophosphoryl difluorides which comprises reacting
 (a) a compound having the formula $R_3PCl_2$ wherein R is selected from the class consisting of alkyl, aryl, chlorine and fluorine, with
 (b) phosphoramidic difluoride
at a temperature range of about 60° C. to about 175° C.
2. The process of claim 1 wherein a temperature range of 120°–150° C. is utilized.
3. A process for preparing phosphazophosphoryl difluorides which comprises reacting
 (a) a compound having the formula $R_3PCl_2$ wherein R is selected from the class consisting of alkyl, aryl, chlorine and fluorine, with
 (b) phosphoramidic difluoride
at a temperature range of about 60° C. to about 175° C. in the presence of an inert diluent.
4. The process of claim 3 wherein a halogenated aliphatic hydrocarbon having up to five carbon atoms and a boiling point of at least 60° C. at atmospheric pressure is utilized as the inert diluent.

References Cited

UNITED STATES PATENTS 2,952,320  2/1960  Kahler _____ 23—357 XR
3,096,371  7/1963  Olah et al. _____ 23—357
3,144,302  8/1964  Fielding _____ 23—357

MILTON WEISSMAN, Primary Examiner.